Figure 1:
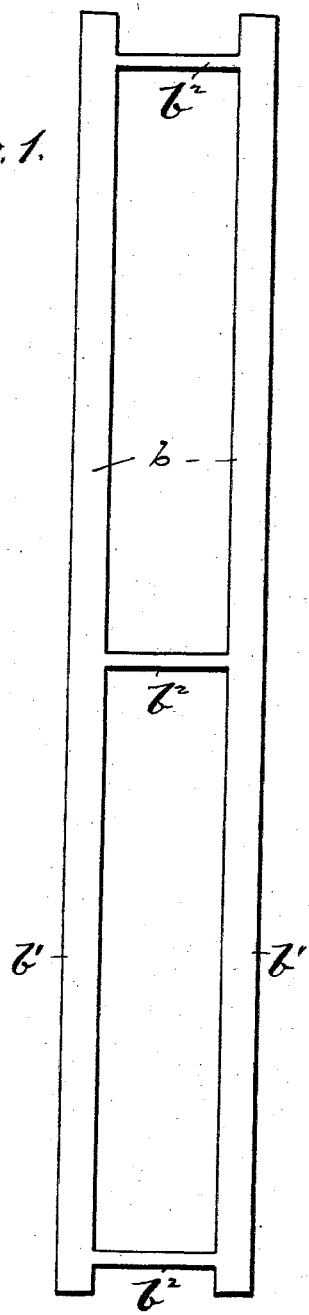

No. 757,675. PATENTED APR. 19, 1904.
H. E. PEUCKER.
MANUFACTURE OF RULERS.
APPLICATION FILED AUG. 30, 1902.
NO MODEL.

Witnesses
Inventor
Heinrich E. Peucker
By Wm E Boulter
Attorney

No. 757,675. Patented April 19, 1904.

UNITED STATES PATENT OFFICE.

HEINRICH ERNST PEUCKER, OF DRESDEN, GERMANY.

MANUFACTURE OF RULERS.

SPECIFICATION forming part of Letters Patent No. 757,675, dated April 19, 1904.

Application filed August 30, 1902. Serial No. 121,692. (No model.)

*To all whom it may concern:*

Be it known that I, HEINRICH ERNST PEUCKER, a subject of the King of Prussia, German Emperor, and a resident of Dresden, Saxony, Germany, have invented certain new and useful Improvements in or Relating to the Manufacture of Rulers, of which the following is a specification.

The present invention relates to a ruler the main part of which is of india-rubber, with a metallic insertion in the india-rubber body in such a manner that the metal insertion projects beyond the rubber edges so far that the drawing-pen is in contact only with the metal, while the rubber body assists to secure the rubber in position upon the paper by reason of its adhesive quality.

In comparison with known devices in which the ruler consists of a flexible metal bar provided with a coating of rubber or the like the present invention has the advantage that the rubber body, forming a whole and embracing the metal insertion, is not liable to separate from the latter, as is the case with metal rulers provided with a rubber coating.

The invention is illustrated by way of example in the accompanying drawings, in which—

Figure 2:
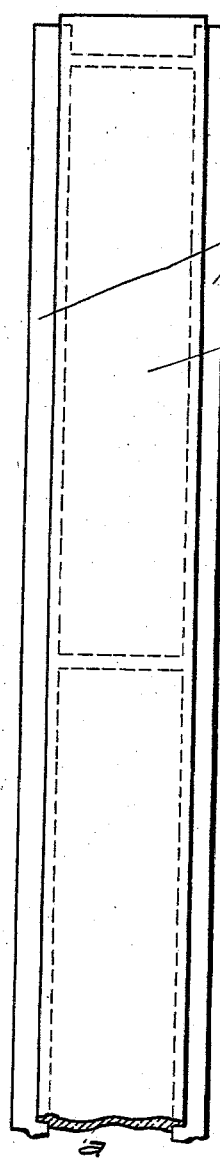
Figure 3:
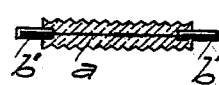

Figure 1 represents the metallic insertion, Fig. 2 being a plan view of part of a flat ruler, and Fig. 3 a section thereof.

According to this invention two strips of rubber $a$ are firmly connected together after the metallic part $b$, which may consist of two metal bars $b'$, connected by cross-pieces $b^2$, has been inserted between them, thus forming an integral unseparable construction, the strips being vulcanized together or connected by cement. The cross-pieces are only few in number and of very slight width and thickness, so that they do not affect the unity of the rubber body, as their total area and mass can be so small as to be negligible in comparison with total area and mass of the rubber body.

A ruler consisting of a rubber body with a metallic insertion has the advantage that the metallic parts do not become uncovered by wear and the ruler adheres firmly to the paper surface, and thus is prevented from slipping during use.

What I claim as my invention, and desire to secure by Letters Patent, is—

In a flexible ruler, the combination of an open metal frame, comprising side members connected by a plurality of cross-pieces, with strips of rubber, situated one above and one below said metal frame, their inner surfaces being directly connected together, the two side edges of the ruler projecting beyond the rubber edges and lying in the same horizontal plane, substantially as described.

In testimony whereof I have signed my name to this specification in the presence of two subscribing witnesses.

HEINR. ERNST PEUCKER.

Witnesses:
    PAUL E. SCHILLING,
    RUD. SCHMIDT.